(«12») United States Patent
Lin et al.

(10) Patent No.: US 10,054,103 B2
(45) Date of Patent: Aug. 21, 2018

(54) ROLLING-DOOR-TYPE LOAD REGULATING DEVICE AND OCEAN ENERGY POWER GENERATING DEVICE USING THE SAME

(71) Applicant: Hangzhou Lindong New Energy Technology Inc., Hangzhou, Zhejiang Province (CN)

(72) Inventors: Dong Lin, Zhejiang (CN); Changzheng Huang, Zhejiang (CN); Zhenghan Chen, Zhejiang (CN); Qiancheng Xu, Zhejiang (CN)

(73) Assignee: Hangzhou Lindong New Energy Technology Inc., Hangzhou, Zhejiang Province (CN)

( * ) Notice: Subject to any disclaimer, the term of this patent is extended or adjusted under 35 U.S.C. 154(b) by 25 days.

(21) Appl. No.: 15/109,783

(22) PCT Filed: Mar. 4, 2014

(86) PCT No.: PCT/CN2014/072878
§ 371 (c)(1),
(2) Date: Jul. 5, 2016

(87) PCT Pub. No.: WO2015/100851
PCT Pub. Date: Jul. 9, 2015

(65) Prior Publication Data
US 2016/0333845 A1    Nov. 17, 2016

(30) Foreign Application Priority Data
Jan. 3, 2014   (CN) .......................... 2014 1 0005969

(51) Int. Cl.
*F03B 13/10*     (2006.01)
*F03B 13/12*     (2006.01)
(Continued)

(52) U.S. Cl.
CPC ................ *F03B 13/12* (2013.01); *E06B 9/08* (2013.01); *E06B 9/68* (2013.01); *F03B 13/264* (2013.01);
(Continued)

(58) Field of Classification Search
CPC ........ F03B 13/12; F03B 13/264; F03B 15/04; F03B 17/06; E06B 9/08; E06B 9/68
(Continued)

(56) References Cited

U.S. PATENT DOCUMENTS

2011/0309624 A1* 12/2011 Ettanoor Thuppale ... F03B 3/18
290/54

FOREIGN PATENT DOCUMENTS

CM    1104289 A    6/1995
CN    2221092 Y    2/1996
(Continued)

OTHER PUBLICATIONS

Machine Translation of CN 203320486.*
Machine Translation of CN 1388300.*

*Primary Examiner* — Tulsidas C Patel
*Assistant Examiner* — Thomas Quigley
(74) *Attorney, Agent, or Firm* — Muncy, Geissler, Olds & Lowe, P.C.

(57) ABSTRACT

A rolling-door-type load regulating device and an ocean energy power generating device using the same are described herein. The rolling-door-type load regulating device includes a water guiding unit, a roller spindle, and a driver. The water guiding unit includes at least two water guiding plates connected in parallel. The roller spindle is fixed to one end of the water guiding unit. The driver is connected with the roller spindle and drives the roller spindle to rotate to spread or retract the water guiding unit. The rolling-door-type load regulating device in the invention
(Continued)

can regulate the load suffered by the hydraulic turbine. Therefore, the power generated by the ocean energy power generating device can be stably output and be directly used, thereby solving the problem that the output power of the conventional ocean energy power generator has wide fluctuations and poor stability.

4 Claims, 10 Drawing Sheets

(51) Int. Cl.
- *E06B 9/08* (2006.01)
- *E06B 9/68* (2006.01)
- *F03B 13/26* (2006.01)
- *F03B 15/04* (2006.01)
- *F03B 17/06* (2006.01)

(52) U.S. Cl.
CPC ............... *F03B 15/04* (2013.01); *F03B 17/06* (2013.01); *F05B 2240/12* (2013.01); *F05B 2240/13* (2013.01); *F05B 2240/40* (2013.01); *F05B 2240/91* (2013.01); *F05B 2240/97* (2013.01); *Y02E 10/28* (2013.01); *Y02E 10/38* (2013.01); *Y02P 70/527* (2015.11)

(58) Field of Classification Search
USPC .................................................... 290/42, 53
See application file for complete search history.

(56) References Cited

FOREIGN PATENT DOCUMENTS

| | | |
|---|---|---|
| CN | 1353235 A | 6/2002 |
| CN | 1388300 A | 1/2003 |
| CN | 203230521 U | 10/2013 |
| CN | 203320486 U | 12/2013 |
| JP | 2012082570 A | 4/2012 |

* cited by examiner

ROLLING-DOOR-TYPE LOAD REGULATING DEVICE AND OCEAN ENERGY POWER GENERATING DEVICE USING THE SAME

BACKGROUND OF THE INVENTION

Field of the Invention

The present invention relates to a regulating device and, more particularly, to a rolling-door-type load regulating device and an ocean energy power generating device using the same.

Description of the Related Art

Ocean energy (including tidal current energy, ocean wave energy, and ocean current energy) refers to mechanical energy generated by the flowing of sea water. As a kind of renewable energy, the ocean energy has great development prospect and value due to its abundant reserve and wide distribution. The primary use of the ocean energy is for power generation. The working principle of ocean energy power generation is similar to that of wind power generation and conventional hydropower generation. That is, the mechanical energy of the sea water is converted into electric energy by energy conversion devices. Specifically, at first, the sea water impacts hydro turbines, the hydro turbines convert the energy of the water flow into the mechanical energy of rotation, and then the hydro turbines drive power generators to generate power via mechanical drive systems, thereby finally converting the mechanical energy to the electric energy.

Nowadays, with the increasing shortage of energy and the increasing serious green house effect, energy is required to be low-carbon. Thus, clean energy, such as wind energy and the ocean energy (including tidal energy, the tidal current energy, the ocean wave energy, and the ocean current energy), is the future direction of energy development. However, the power generating devices for the clean energy are still developing, and the utilization of the ocean energy is still in an initial stage, except the relatively mature wind energy utilization.

Since the ocean energy is not steady, especially the flow rate of the sea flow varies greatly, the existing ocean energy generating apparatus has problems that investment costs are too high to realize commercialization due to the unsteady and widely fluctuating output power.

BRIEF SUMMARY OF THE INVENTION

To improve the prior art, this invention provides a rolling-door-type load regulating device for regulating the water flow flowing towards a hydraulic turbine and an ocean energy power generating device using the same.

To achieve one objection of the invention, the invention provides a rolling-door-type load regulating device including a water guiding unit, a roller spindle, and a driver. The water guiding unit includes at least two water guiding plates connected in parallel. The roller spindle is fixed to one end of the water guiding unit. The driver is connected with the roller spindle and drives the roller spindle to rotate to spread or retract the water guiding unit.

According to one embodiment of the invention, the rolling-door-type load regulating device may further include at least two guiding rails. The two guiding rails may be located at the same side of the roller spindle in parallel, and when the roller spindle spreads the water guiding unit, two sides of the other end of the water guiding unit may enter into the two guiding rails, respectively.

According to one embodiment of the invention, the rolling-door-type load regulating device may further include at least one connecting shaft and at least two rollers. The at least two water guiding plates may be connected via the connecting shaft, and the rollers may be sleeved on two ends of the connecting shaft. When the roller spindle spreads the water guiding unit, two sides of the other end of the water guiding unit may enter into the two guiding rails, respectively, and the two rollers may slide in the two guiding rails, respectively.

According to one embodiment of the invention, an angle between the water guiding plates and a water flow direction may be larger than zero degree and smaller than or equal to 90 degrees.

According to one embodiment of the invention, a section of each water guiding plate may be curved.

To achieve another objective of the invention, the invention further provides an ocean energy power generating device including a frame, at least one hydraulic turbine, at least one electric generator, and a rolling-door-type load regulating device. The at least one hydraulic turbine is disposed in the frame. The at least one electric generator is connected with the hydraulic turbine. The rolling-door-type load regulating device includes a water guiding unit, a roller spindle, and a driver. The water guiding unit includes at least two water guiding plates connected in parallel. The roller spindle is fixed to one end of the water guiding unit. The driver is connected with the roller spindle and drives the roller spindle to rotate to spread or retract the water guiding unit.

According to one embodiment of the invention, the rolling-door-type load regulating device may further include at least two guiding rails. The two guiding rails may be located at the same side of the roller spindle and disposed at the frame in parallel, and when the roller spindle spreads the water guiding unit, two sides of the other end of the water guiding unit may enter into the two guiding rails, respectively.

According to one embodiment of the invention, the rolling-door-type load regulating device may further include at least one connecting shaft and at least two rollers. The at least two water guiding plates may be connected via the connecting shaft, and the rollers may be sleeved on two ends of the connecting shaft. When the roller spindle spreads the water guiding unit, two sides of the other end of the water guiding unit may enter into the two guiding rails, respectively, and the two rollers may slide in the two guiding rails, respectively.

According to one embodiment of the invention, an angle between the water guiding plates and a water flow direction may be larger than zero degree and smaller than or equal to 90 degrees.

According to one embodiment of the invention, a section of each water guiding plate may be curved.

To sum up, the rolling-door-type load regulating device in the invention can regulate the load suffered by the hydraulic turbines. Therefore, the power generated by the ocean energy power generating device can be stably output and be directly used, thereby solving the problem that the output power of the conventional ocean energy power generator has wide fluctuations and poor stability.

In addition, via forming an angle between the water guiding plates and the water flow direction, not only can the rolling-door-type load regulating device retract the upstream guiding plates and spread a part of the downstream guiding plates to lower the output load of the hydraulic turbines when the speed of the water flow is too large, but also the regulating device can spread all the upstream water guiding plates to effectively guide the water flow to flow towards the direction vertical to the concave portion of the blade of the hydraulic turbine when the speed of water flow is small, thereby increasing the impact force of the water flow exerted to the hydraulic turbine and improving the rotation of the hydraulic turbine, and improving the generating power.

These and other features, aspects, and advantages of the present invention will become better understood with regard to the following description, appended claims, and accompanying drawings.

DETAILED DESCRIPTION OF THE INVENTION

Figure 1:
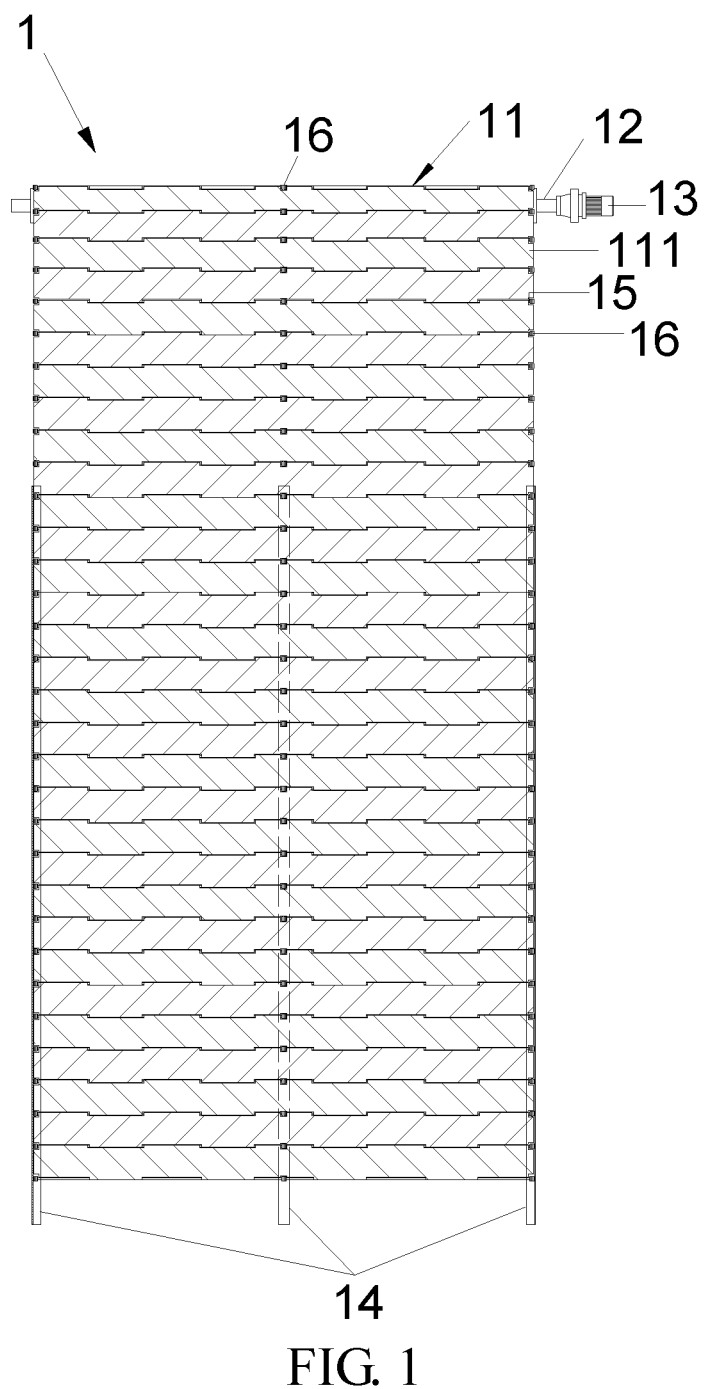
FIG. 1 is a front view of a rolling-door-type load regulating device according to this invention.
Figure 2:
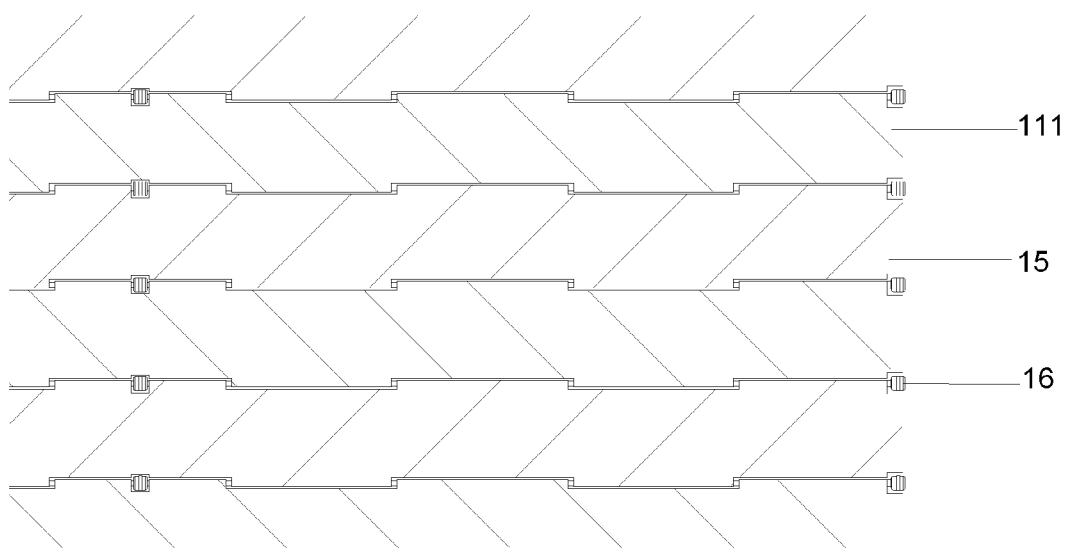
FIG. 2 is a partial enlarged view of FIG. 1.
Figure 3:
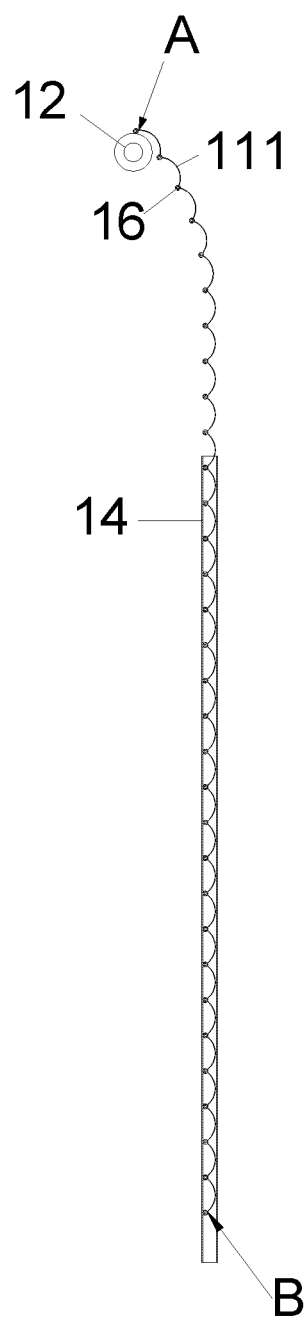
FIG. 3 is a side view of FIG. 1.
Figure 4:
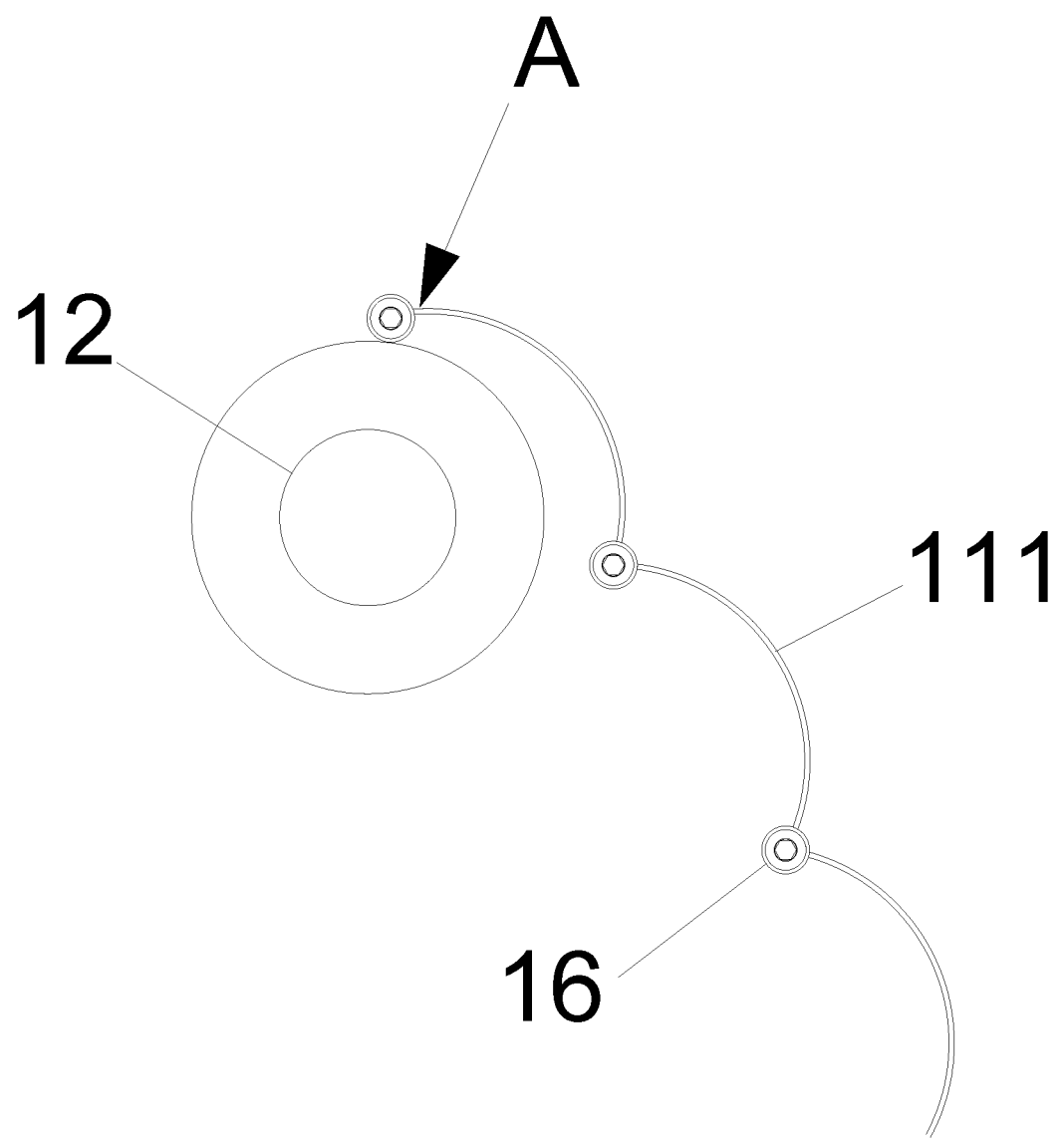
FIG. 4 is a partial enlarged view of FIG. 3.
Figure 5:
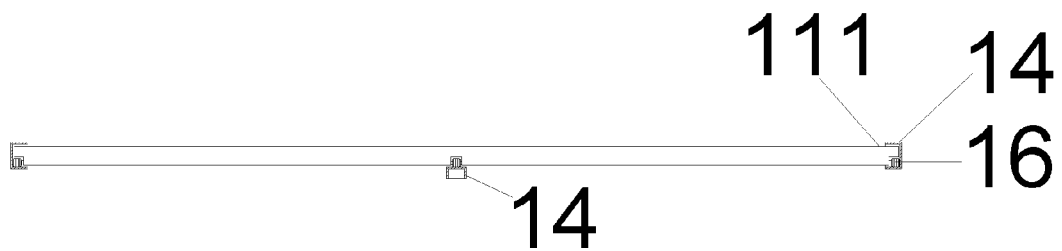
FIG. 5 is a bottom view of FIG. 1.
Figure 6:
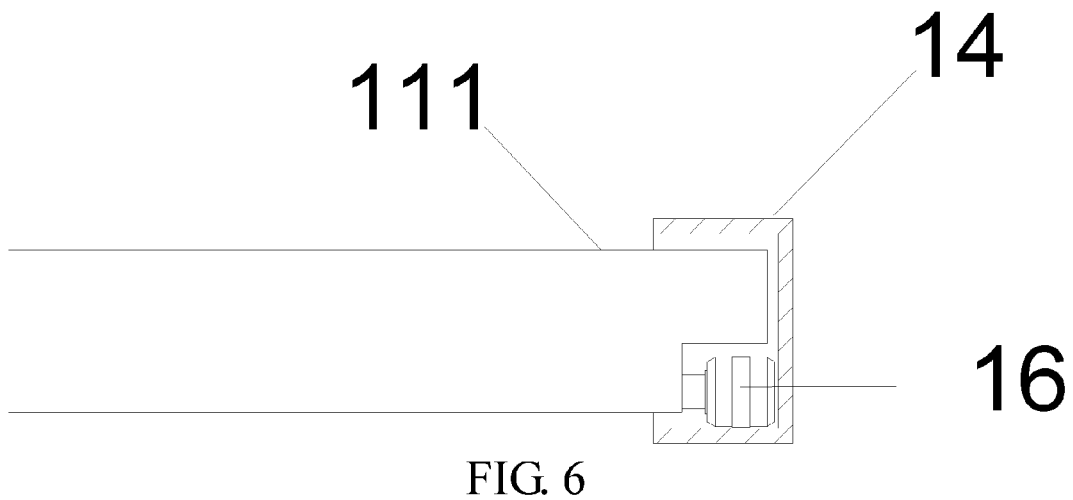
FIG. 6 is a partial enlarged view of FIG. 5.

FIG. 1 is a front view of a rolling-door-type load regulating device according to this invention. FIG. 2 is a partial enlarged view of FIG. 1. FIG. 3 is a side view of FIG. 1. FIG. 4 is a partial enlarged view of FIG. 3. FIG. 5 is a bottom view of FIG. 1. FIG. 6 is a partial enlarged view of FIG. 5. Please refer to FIG. 1 to FIG. 6 together.

The rolling-door-type load regulating device 1 includes a water guiding unit 11, a roller spindle 12, and a driver 13. The water guiding unit 11 includes at least two water guiding plates 111 connected in parallel. In this embodiment, the number of the water guiding plates 111 is more than two. However, the invention is not limited thereto. The number of the water guiding plates 111 is at least two, effectively reducing the length of each water guiding plate 111 along a direction vertical to the horizontal plane and increasing resistance of each water guiding plate 111 against impaction of a water flow. If the length of one water guiding plate 111 along the vertical direction is too long, since the impaction of the water flow is large, the water guiding plate 111 is easily deformed and even broken in the middle.

The roller spindle 12 is fixed to one end A of the water guiding unit 11. The driver 13 is connected with the roller spindle 12, and the driver 13 drives the roller spindle 12 to rotate to spread or retract the water guiding unit 11. In the embodiment, the section of each water guiding plate 111 is curved, that is, each water guiding plate 111 is a curved plate. Therefore, when the roller spindle 12 retracts the water guiding unit 11, the water guiding plates 111 can further fit to the roller spindle 12 to reduce space. However, the invention is not limited thereto.

In the embodiment, a direction of an axis of the roller spindle 12 is parallel to the horizontal plane. However, the invention is not limited to. In other embodiments, the axis of the roller spindle 12 may be vertical to the horizontal plane. In the invention, the position of the roller spindle 12 is not limited either.

In the embodiment, the rolling-door-type load regulating device 1 further includes at least two guiding rails 14, and the two guiding rails 14 are located at the same side of the roller spindle 12 in parallel. When the roller spindle 12 spreads the water guiding unit 11, two sides of the other end B of the water guiding unit 11 enter into the two guiding rails 14, respectively. In the embodiment, one water guiding unit 11 corresponds to three guiding rails 14, two of which are disposed at two sides of the water guiding unit 11, and the other guiding rail 14 is disposed in the middle of the water guiding unit 11. However, the number of the guiding rails 14 is not limited in the invention. One end A of the water guiding unit 11 is fixed via connection with the roller spindle 12, and the other end B of the water guiding unit 11 is used for limiting position via the guiding rails 14. As two ends of the water guiding unit 11 are positioned, respectively, the water guiding unit 11 can be fully spread to form a "protective screen" to stop or guide the water flow.

In the embodiment, the rolling-door-type load regulating device 1 further includes at least one connecting shaft 15 and at least two rollers 16. The at least two water guiding plates 111 are connected via the connecting shaft 15, and the rollers 16 are sleeved on two ends of the connecting shaft 15. When the roller spindle 12 spreads the water guiding unit 11, two sides of the other end B of the water guiding unit 11 enter into the two guiding rails 14, respectively, and the two rollers 16 slide in the two guiding rails 14, respectively. In the embodiment, the number of the connecting shaft 15 is one less than the number of the water guiding plates 111, each connecting shaft 15 corresponds to three rollers 16, and the number of the rollers 16 corresponds to the number of the guiding rails 14. However, the invention is not limited thereto.

In the embodiment, each water guiding plate 111 has holes at two edges and can be concave-convex shaped, respectively, and edges of the adjacent two water guiding plates 111 can match with each other. The connecting shaft 15 passes through the holes to connect the water guiding plates 111. The water guiding plates 111 are connected through the connecting shaft 15, allowing each water guiding plate 111 to be capable of rotating to change the direction. Therefore, when the water guiding unit 11 is retracted, the water guiding plates 111 can be retracted around the roller spindle 12. When the water guiding unit 11 is spread, a plurality of the water guiding plates 111 is nearly located at one line as a whole, further to form the "protective screen" to effectively stop or guide the oncoming water flow. As the roller spindle 12 continuously spreads the water guiding unit 11, the rollers 16 roll along the guiding rails 14 from the top to bottom seen from FIG. 1, thus to spread the water guiding unit 11. The rollers 16 can effectively guide two sides of the other end B of the water guiding unit 11 to enter into the two guiding rails 14, thus to effectively fix the other end B.

Figure 7:
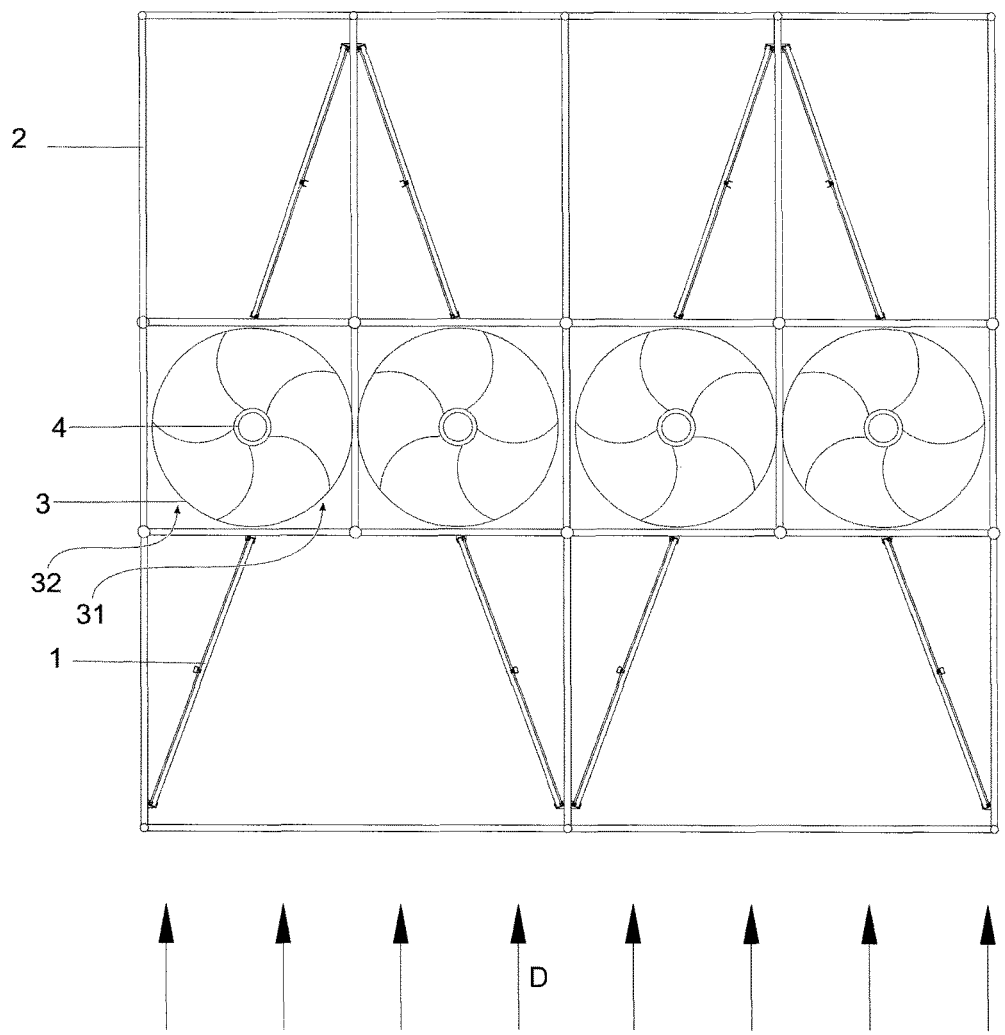
FIG. 7 is a top view of an ocean energy power generating device according to a first embodiment of the invention.
Figure 8:
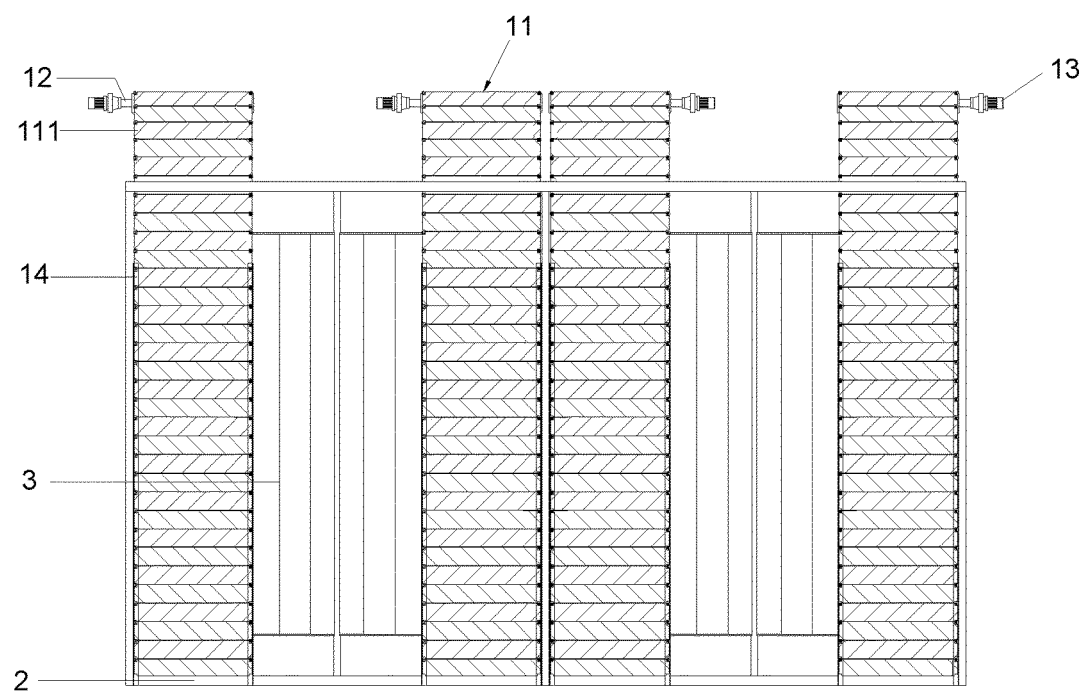
FIG. 8 is a front view of the ocean energy power generating device according to the first embodiment of the invention.

FIG. 7 is a top view of an ocean energy power generating device according to a first embodiment of the invention. FIG. 8 is a front view of the ocean energy power generating device according to the first embodiment of the invention (to make the figure more clear, a rolling-door-type load regulating device located at the downstream is not illustrated). Please refer to FIG. 7 and FIG. 8 together.

In the first embodiment, an ocean energy power generating device includes a frame 2, at least one hydraulic turbine 3, at least one electric generator 4, and a rolling-door-type load regulating device 1. The at least one hydraulic turbine 3 is disposed in the frame 2. The at least one electric generator 4 is connected with the hydraulic turbine 3. The rolling-door-type load regulating device 1 includes a water guiding unit 11, a roller spindle 12, and a driver 13. The water guiding unit 11 includes at least two water guiding plates 111 connected in parallel. The roller spindle 12 is fixed to one end of the water guiding unit 11. The driver 13 is connected with the roller spindle 12, and the driver 13 drives the roller spindle 12 to rotate to spread or retract the water guiding unit 11. In this embodiment, the rolling-door-type load regulating device 1 is disposed at upstream and downstream sides of the hydraulic turbine 3 along a water flow direction D, respectively.

In the embodiment, the rolling-door-type load regulating device 1 further includes at least two guiding rails 14, and the two guiding rails 14 are located at the same side of the roller spindle 12 and are disposed at the frame 2 in parallel. When the roller spindle 12 spreads the water guiding unit 11, two sides of the other end B of the water guiding unit 11 enter into the two guiding rails 14, respectively. In the embodiment, the rolling-door-type load regulating device 1 further includes at least one connecting shaft 15 and at least two rollers 16 (as shown in FIG. 1). The at least two water guiding plates 111 are connected via the connecting shaft 15, and the rollers 16 are sleeved on two ends of the connecting shaft 15. When the roller spindle 12 spreads the water guiding unit 11, two sides of the other end of the water guiding unit 11 enter into the two guiding rails 14, respectively, and the two rollers 16 slide in the two guiding rails 14, respectively.

In the embodiment, the number of the hydraulic turbine 3 is an even number, and two adjacent hydraulic turbines 3 are axially symmetrically arranged so as to allow the two adjacent hydraulic turbines 3 to rotate in opposite directions. Specifically, the bending directions of the blades of the two adjacent hydraulic turbines 3 are axially symmetrical. As shown in FIG. 7, every two hydraulic turbines 3 form a group and are disposed in parallel. The hydraulic turbine 3 on the left side rotates in a counter-clockwise direction, while the hydraulic turbine 3 on the right side rotates in a clockwise direction. By setting the rotating directions of the adjacent hydraulic turbines 3 to be opposite, the collection and the evacuation of water are effectively improved and the flowing rate is also improved. Thus, the hydraulic turbines 3 rotate faster to improve the power generation efficiency.

In the embodiment, the hydraulic turbines 3 are resistance type hydraulic turbines. Take the left-most hydraulic turbine 3 in FIG. 7 for example. The water flow flowing towards a motivation side 31 (the right-hand side in FIG. 7) of the hydraulic turbine 3 can rush to a concave portion of an impeller, thereby driving the hydraulic turbine 3 to rotate counterclockwise, while the water flow flowing towards a resistance side 32 (the left-hand side in FIG. 7) of the hydraulic turbine 3 can drive the impeller to rotate in the opposite direction. In other words, the water flow flowing towards the left side of the hydraulic turbine 3 will cause a resistance.

In the embodiment, the angle between the water guiding plates 111 and the water flow direction D is larger than zero degree and smaller than 90 degrees. Thus, the rolling-door-type load regulating device 1 in the invention can not only stop the water flow but also guide the water flow.

In detail, when the speed of the water flow is small, the driver 13 drives the roller spindle 12 to totally retract the downstream water guiding plates 111, and the upstream water guiding plates 111 are totally spread to form a protective screen, thus to effectively stop the water flow flowing to the resistance side 32 of the hydraulic turbine 3, and to guide the upstream water flow totally to the motivation side 31 of the hydraulic turbine 3. That is, the water flow is guided to a direction vertical to the concave portion of the blade of the hydraulic turbine 3, thereby increasing impaction of the water flow to the hydraulic turbine 3, improving the rotation of the hydraulic turbine 3, and improving the generating power of the electric generator 4. When the generating power has wide fluctuations due to an excessively high speed of the water flow, the driver 13 drives the roller spindle 12 to retract the upstream water guiding plates 111 and partly spread the downstream water guiding plates 111, and the water flow is allowed to flow into the resistance side 32 of the hydraulic turbine 3, thereby effectively slowing the excessively fast rotation of the hydraulic turbine 3, thus to stabilize the generating power.

Figure 9:
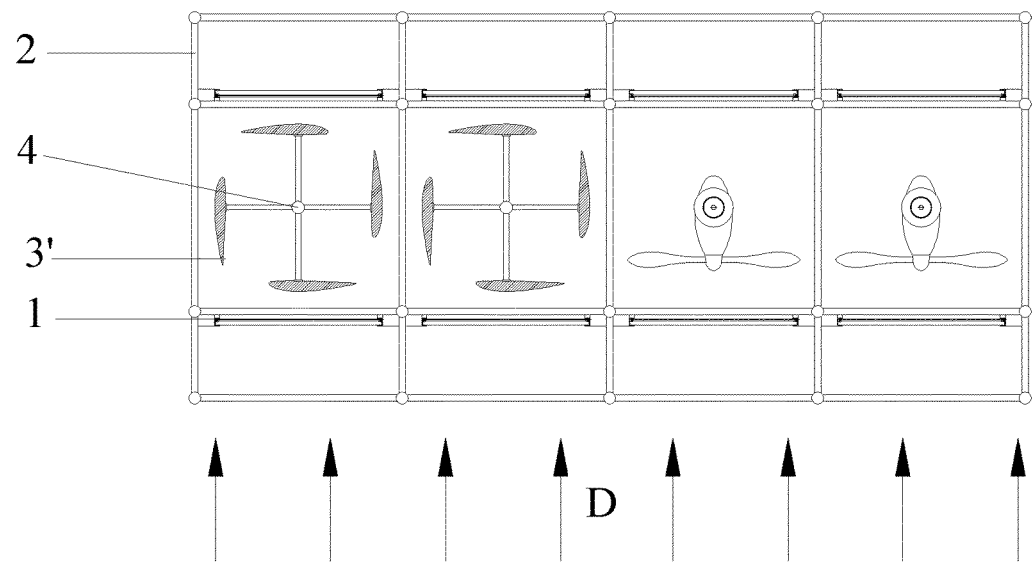
FIG. 9 is a top view of an ocean energy power generating device according to a second embodiment of the invention.
Figure 10:
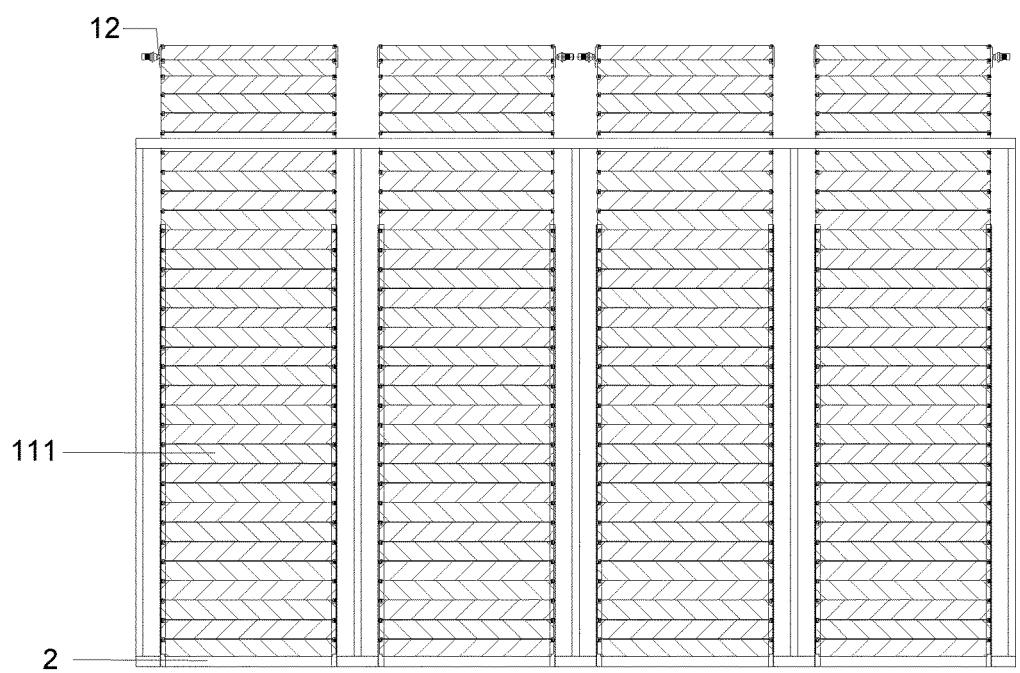
FIG. 10 is a front view of the ocean energy power generating device according to the second embodiment of the invention.

FIG. 9 is a top view of an ocean energy power generating device according to a second embodiment of the invention. FIG. 10 is a front view of the ocean energy power generating device according to the second embodiment of the invention. Please refer to FIG. 9 and FIG. 10 together.

In the second embodiment, an ocean energy power generating device includes a frame 2, at least one hydraulic turbine 3', at least one electric generator 4, and a rolling-door-type load regulating device 1. The same element is numbered with the same reference number. The main difference between the second embodiment and the first embodiment lies in that the angle between the water guiding plates 111 and the water flow direction D is equal to 90 degrees, and the hydraulic turbine 3' can be horizontal-axis hydraulic turbine and can be vertical-axis hydraulic turbine.

All the blades of the hydraulic turbine 3' in the second embodiment bear force. When the speed of the water flow is too high, the driver 13 can drive the roller spindle 12 to retract the downstream water guiding plates 111 and to spread the upstream water guiding plates 111, thereby forming the protective screen to effectively stop the water flow flowing to the hydraulic turbine 3'. Thus, the generating power can be prevented from increasing sharply and being unstable, and the problem that the generating power cannot be output directly can be solved. When the speed of the water flow is small, the roller spindle 12 can retract the water guiding plates 111 such that all the water flows can flow to the hydraulic turbine 3'.

To sum up, the rolling-door-type load regulating device in the invention can regulate the load suffered by the hydraulic turbines. Therefore, the power generated by the ocean energy power generating device can be stably output and be directly used, thereby solving the problem that the output power of the conventional ocean energy power generator has wide fluctuations and poor stability.

In addition, via forming an angle between the water guiding plates and the water flow direction, not only can the rolling-door-type load regulating device retract the upstream guiding plates and spread a part of the downstream guiding plates to lower the output load of the hydraulic turbines when the speed of the water flow is too large, but also the regulating device can spread all the upstream water guiding plates to effectively guide the water flow to flow towards the direction vertical to the concave portion of the blade of the hydraulic turbine when the speed of water flow is small, thereby increasing the impact force of the water flow exerted to the hydraulic turbine and improving the rotation of the hydraulic turbine, and improving the generating power.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. An ocean energy power generating device comprising:
  a frame;
  at least one hydraulic turbine, disposed in the frame;
  at least one electric generator connected with the hydraulic turbine; and
  a rolling-door-type load regulating device disposed at the frame and comprising:
    a water guiding unit, comprising at least two water guiding plates connected in parallel, wherein an angle between the water guiding plates and a water flow direction is larger than zero degrees and smaller than 90 degrees such that the water guiding plates are configured to guide the water flow towards a motivation side of the hydraulic turbine and stop the water flow from flowing to a resistance side of the hydraulic turbine;
    a roller spindle, fixed to one end of the water guiding unit; and
    a driver, connected with the roller spindle, the driver being configured to drive the roller spindle to rotate to spread or retract the water guiding unit so as to control the water flow to the motivation and resistance sides of the hydraulic turbine.

2. The ocean energy power generating device according to claim 1, wherein the rolling-door-type load regulating device further comprises at least two guiding rails, the two guiding rails are located at the same side of the roller spindle and disposed at the frame in parallel, and when the roller spindle spreads the water guiding unit, two sides of the other end of the water guiding unit enter into the two guiding rails, respectively.

3. The ocean energy power generating device according to claim 2, wherein the rolling-door-type load regulating device further comprises at least one connecting shaft and at least two rollers, the at least two water guiding plates are connected via the connecting shaft, and the rollers are sleeved on two ends of the connecting shaft, and when the roller spindle spreads the water guiding unit, two sides of the other end of the water guiding unit enter into the two guiding rails, respectively, and the two rollers slide in the two guiding rails, respectively.

4. The ocean energy power generating device according to claim 1, wherein a section of each water guiding plate is curved.

* * * * *